March 1, 1966 A. BRUGNOLA 3,237,396
CHAIN LINKS AND SELF-LINKING CHAINS
Filed Nov. 13, 1962

INVENTOR
ANTHONY BRUGNOLA
BY T. V. Michaelis
ATTORNEY

United States Patent Office 3,237,396
Patented Mar. 1, 1966

3,237,396
CHAIN LINKS AND SELF-LINKING CHAINS
Anthony Brugnola, Brady Road, Worcester, N.Y.
Filed Nov. 13, 1962, Ser. No. 237,200
14 Claims. (Cl. 59—85)

This invention relates to chains, and more particularly to chains assembled from chain links capable of being added or removed individually, and especially from self-linking elements, for general use as well as for torque-transmitting purposes in flexible shafts and the like.

Although a wide variety of chains is in common use, and many more have been proposed in the art, most if not all of these share a number of drawbacks which have severely restricted the choice of materials available and the usefulness of chains made from the limited number of materials deemed suitable in view of the restrictive characteristics of known chain structures. Quite some of these drawbacks derive from the fact that in the process of joining one link to another to produce the conventional permanently linked type of chain, each link must be forcibly pressed or otherwise formed into shape to be subsequently, in most cases at least, welded. Inasmuch as each link includes two thicknesses of bar, it might be supposed that a chain assembled from such links would have twice the strength of a single bar. This is not true, however, as by being forced into a link, the strength of the bar, instead of being doubled, is reduced approximately thirty percent with the result that the chain has only about seventy percent of the strength of the bar. Another and even more severe basic disadvantage of existing chains is the manifest limitation with respect to material; only a limited number of cast iron formulations yielding iron which is both weldable and readily deformable lend themselves to chain-making purposes. Exceptions such as steel and aluminum chains cast by a special process do exist, but these are so costly that they are used only for special applications where cost is no object. Present chains suffer from the further disadvantage that in order to separate a length of chain from the rest of it, one link has to be cut, sawed, filed, snipped off or otherwise broken and removed. Still another drawback of existing chains is the fact that since the links are loosely interlinked, the stress is primarily in bending rather than shear, and wear through use is concentrated locally thus decreasing the cross-section of the bar at one or several points with a consequent weakening of the strength of the entire chain. In addition to the aforenoted shortcomings, existing chains suffer from limitations of utility; thus, present chains can not be used, successfully, as driving members of flexible shafts as they are liable to kink and "whip" under torque loads and their length does not remain constant. These and other disadvantages of chains in common use have prompted the accomplishment of the present invention.

It is a primary object of this invention to provide a chain which requires no deformation, shaping, or welding to remain linked or in concatenation, and which is composed of individually replaceable links or preferably, of self-linking elements.

Another principal object of the present invention is to provide a chain which can be stamped, drop-forged, cast, die-cast or die-forged or otherwise manufactured from any chosen material, from the hardest to the most malleable, so as to lend the finished chain the intrinsic strength and other desirable characteristics of the material itself.

Still another primary object of the invention is to provide a chain which is not merely self-linking, but which, moreover, once it is assembled, is protected from becoming unlinked by any accidental stress; which can be stored and shipped in the form of chain elements or unfinished links, for assembly in situ, and which is capable of lengthwise adjustment by a simple addition or removal of some links.

It is a further object of this invention to provide chain elements to form individual links which are alike in every respect and hence, interchangeable with one another.

It is still another important object of the present invention to provide a chain which is susceptible of use as the driving member of a torque transmitter such as a flexible shaft.

A still further object of the invention is to provide a chain capable of being driven in any direction without limitations and yet maintaining its precise finished length, through the use of sprockets as in conveyor mechanisms, sheaves, pulleys and the like.

It is another important object of the present invention to provide a chain which being made from any suitable material, partakes of its characteristics such as e.g. a self-lubricating non-sticking material such as Teflon, or an acid and heat resistant, non-static, readily cleaned material, as glass.

Yet another object of the invention is to provide a means whereby any rigid materials so far unusable because they could not be welded, can be made pliant and capable of assuming any configuration, as for example titanium when used as reinforcement of plastics of the thermoset variety, or cementitious materials which must follow a curved line.

Other objects and the manner in which the same are attained, will become apparent as this specification proceeds.

In the drawings accompanying this specification and forming part thereof, several embodiments of the invention are shown diagrammatically by way of example, and it should be clearly understood that these representations are intended for illustrative rather than any limitative purposes.

Figure 1:
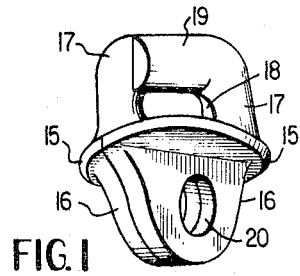
FIG. 1 shows, in perspective, two self-linking half links.
Figure 2:
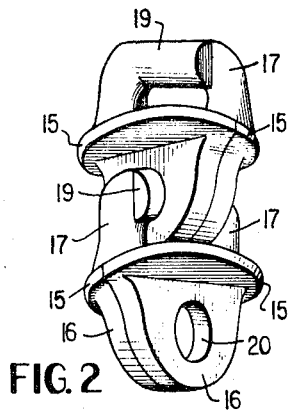
FIG. 2 is a similar showing of a chain composed of the self-linking, composite link units according to FIG. 1.

Referring to the drawings wherein like elements are denoted by identical reference numerals, and first to the preferred embodiment of the invention shown in FIGS. 1 to 5, incl.; a link is shown which is composed of half links, the resulting composite links being assembled, in the absence of any extraneous pins, snap rings, etc. to form a chain. FIG. 1 shows two semi-disks 15 and integral therewith, an eye portion 16, one on each half-disk, disposed at right angles to the plane of the disk and with an inner flat face aligned on the diameter on which the half disk 15 terminates. The eye portion 16 is perforated to enclose a hole 20. On the opposite side each half disk 15 mounts a shoulder 17 of roughly semi-cylindrical configuration, the flat inner side 18 of which does not protrude beyond a line which is spaced from the center line by the thickness of eye portion 16. The shoulder 17 extends into a semi-cylindrical pin 19 of a radius corresponding to the radius of the hole 20, which is disposed in a plane parallel to but spaced from the plane of the half-disk 15. The half-pin 19 has a flat face disposed in the plane of the flat faces of the half-disk 15 and the correlated eye portion 16. The length of the half-pin 19 is such that it will abut against the shoulder 17 of the mating half-link. Once a chain is assembled from a series of chain elements according to FIG. 1, only the last link of the chain, as shown in FIG. 2, can be taken apart so as to separate the mating half-links, whereas the intermediate links are held in engagement by the respective composite pins of the adjacent links. Any attempt at rotating a half-link about the pin traversing its eye portion is resisted by the length and position of its own half-pin within the holes of the two mating eye portions of the adjacent link. Thus, the chain according to FIGS. 1 and 2 is self-linking yet capable of being disassembled only from the terminal link on.

Figure 3:
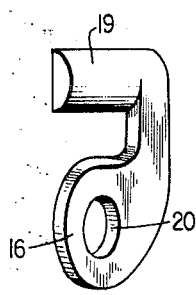
FIGS. 3, 4 and 5 show, in perspective a half-link, a composite link unit composed of such half-links, and a chain assembled from such composite link units, respectively, of a modified embodiment of the invention omitting a central disk portion.
Figure 4:
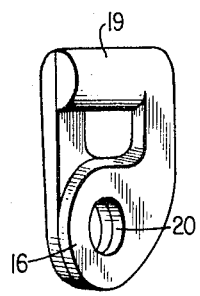
Figure 5:
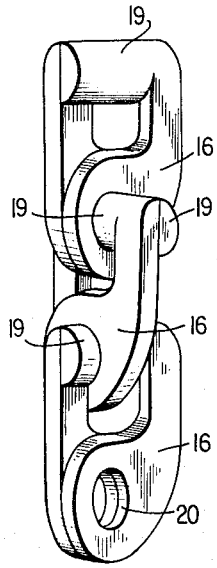

The half-links, composite links and chains assembled therefrom, according to FIGS. 3, 4 and 5, respectively, correspond in all essential respects to the composite links and chain illustrated in FIGS. 1 and 2, except for the omission of the disk portions 15. It will be appreciated that this omission does not detract from the utility of the chain as long as it is to be used as such; if used as the driving element for torque transmitting purposes in a flexible shaft, the presence of the disk portion 15, of course, is most desirable for anti-friction guide purposes when the chain drive is disposed within the usual tubular casing or the like.

The embodiments of the invention according to FIGS. 1 and 2, and 3, 4 and 5, respectively, have in common that the half-pins and the holes in the eye portions, on continuous use, are subject to a certain amount of wear; if, however, the half-pins are made long enough that no amount of wear will allow them to slip out of the respective holes in the eye portions accommodating them, a chain results which is not only convenient but foolproof and distinguished by a long life.

Figure 6:
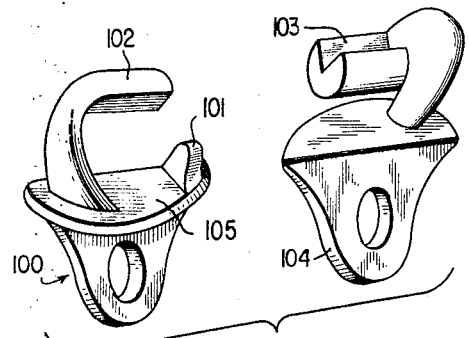
FIG. 6 is a perspective showing of two modified half-links distinguished by key and groove portions on the pins.

FIG. 6 illustrates another modification of the composite link elements according to FIGS. 1 and 2, and 3 to 5, respectively, which involves male and female half-links with interesting and attractive characteristics useful wherever the departure from identical half-links is not considered objectionable. Instead of being provided semi-cylindrical, with their flat base disposed in the terminal plane of the half-link that on assembly becomes the center plane traversing the link, the half-pins according to FIG. 6 have wedge-shaped projections 102 or corresponding wedge-shaped cut-outs 103 which are precisely machined for perfect interengagement. The half-pin 102 which is integral with the eye portion 100, is designed as a deep but narrow section which allows it to engage the holes in the eye portions of the adjacent link with enough play that it can be lowered a considerable distance within such holes. A boss 101 acting as a stop, is mounted on the usual half-disk portion 105 and so constricts the space between it and the pin, that the edges of the eye portion of the next adjacent link can just slip through. Once this is accomplished, the half link is raised to its proper position, and the half-pin 103 of the matching half-link is slid into the hole, in precise interengagement with the mating half-pin. Manifestly, no matter how much one half-pin is displaced in relation to the other, the next link will still be held firmly in position.

Figure 7:
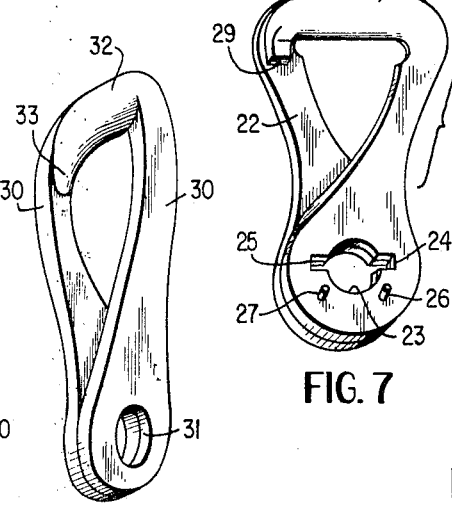
FIG. 7 is a similar showing of another modified pair of half-links.
Figure 8:
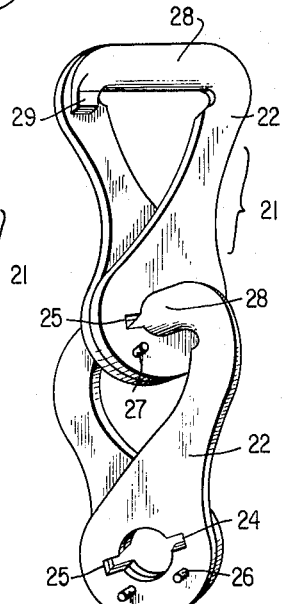
FIG. 8 shows a length of chain composed of the composite link units of FIG. 7.

Another preferred embodiment of the invention is shown in FIGS. 7 and 8. Each half-link 21 consists of a stem 22 suitably designed for strength which at the bottom, extends into an eye portion having the hole 23. Keyways 24 and 25 extend from the hole 23 on opposite sides thereof, and small bosses or stops 26 and 27 rise from the outer faces of the eye portions in proximity to keyways 24 and 25. At the top, each stem 22 is bent to extend into a half-pin 28 of semi-cylindrical configuration terminating in a key or tooth 29 which is capable of entering either one of the keyways 24 and 25.

In the assembly of a chain according to FIG. 8, from the composite link elements of FIG. 7, one of the half-links 21 is angled to a degree (exceeding 90°) such that it allows a tooth 29 of a half-link belonging to the next lower link, to slide through one of the keyways 24 or 25 so the half-pin 28 passes into the hole 23. While the half-link 21 is still in its angled position, its mate is angled to lie adjacent to it from the opposite direction and with its key or hook 29 aligned within half of the keyway 24 or 25.

Now this key is slid in so the coordinated semi-cylindrical half-pin passes through the hole 23, into mating relationship with the other half-pin, and on return of the upper half-links 21 from their angled into vertical or mutually parallel positions, the upper and lower composite links assume the positions indicated in the chain of FIG. 8.

When the two half-pins 28 have penetrated the hole 23, from either side thereof, as far as they can go, their terminal key or tooth portions 29 will be spaced, by a small distance, from the outer faces of the eye portions surrounding the holes 23. This spacing allows the small bosses 26 or 27 to slip through when the link portions are returned from their angled into their straightened positions. Henceforth, any attempt of the half-links 21 to become unlinked and to slide out of the hole 23, will be counteracted by the bosses 26 or 27 against one of which either tooth 29 will abut if the link is accidentally angled. This device permits, however, to unlink and again relink the assembled chain at any one link, by pushing the respective half-pins into the holes as far as they can go and passing the respective teeth past the bosses. This chain, therefore, is not only self-linking but moreover, is capable of being disassembled at any desired point whereby adjustment, lengthening or shortening, at any point of the chain is possible.

Figure 10:
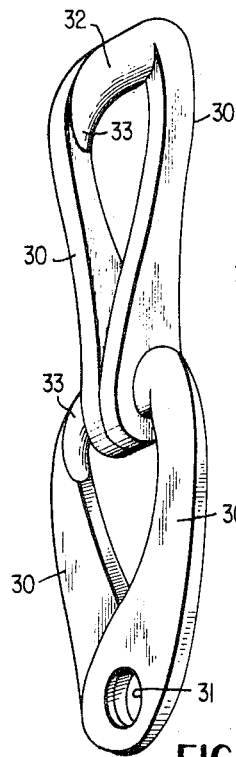
FIG. 10 illustrates a chain composed of the composite link units according to FIG. 9.
Figure 9:
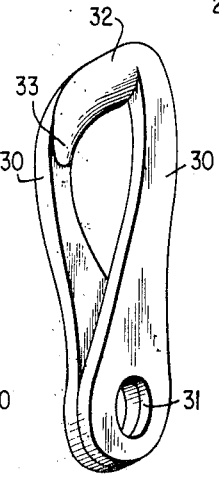
FIG. 9 is a similar showing of another type of half-links as assembled.

Another preferred embodiment of the invention which is particularly suitable for economical chains incorporating long links, is illustrated in FIGS. 9 and 10, wherein the former shows a composite link comprising half-links, while the latter shows a length of chain assembled from the composite links of FIG. 9. Each half-link includes a stem 30 suitably designed for withstanding both tensile and bending stresses, which at the bottom extends into an eye portion perforated by a hole 31, and which at the top is bent to extend into a half-pin 32 of the same radius as hole 31, said half-pin being semi-cylindrical over a distance approximately equal to the thickness of two combined eye portions, to then taper and curve into a sharp hook or beak 33. The outside curvature of the beak as well as its thickness and shape are designed for permitting such beak, on angling of each half-link, to enter the holes 31 of the next-following link and on return of the half-links from their angled positions, to become locked in the hole of the next-following link. It is apparent that when the next link is similarly linked through the hole 31 provided in its eye portion, it cannot be unlinked. Hence a chain according to FIG. 10, assembled from half-links combined as shown in FIG. 9, is self-linking as well as absolutely secured against any accidental unlinking.

I wish it to be understood that I do not desire to be limited to the precise details of construction, design and operation shown and described, as numerous modifications falling within the scope of the appended claims and involving no departure from the spirit of the invention nor any sacrifice of the advantages thereof, will occur to people versed in the art.

I claim:
1. A self-linking chain element comprising two half-links each comprising an eye portion and a half-pin portion extending in the plane of said eye portion, said half-pin portions comprising substantially semi-cylindrical pins adapted on assembly of the two half-links, to form a substantially cylindrical pin, said eye portions being adapted to be traversed by the pin of the next following chain element, said pin extending in a plane normal to the plane of the first-mentioned half-pin and eye portions, whereby to lend said chain elements the characteristics of a universal joint.

2. A self-linking chain element comprising two half-links according to claim 1, wherein said half-pin portions are provided sufficiently long that they project beyond the confines of the eye portions of the next following link which they are adapted to traverse.

3. A self-linking chain element comprising two half-links according to claim 1, wherein said half-pin portions include flat inner faces for mutually abutting disposition to form on assembly of the two half-links, a substantially cylindrical pin.

4. A self-linking chain element according to claim 1 including half-disks interposed between the eye portion and the half-pin portion of each half-link, said disks extending in a plane normal to the plane of said eye portion and said pin.

5. A self-linking chain element according to claim 1 including half-disks interposed between the eye portion and the half-pin portion of each half-link, said disks extending in a plane normal to the plane of said eye portion and said pin, said half-pin portions extending in a plane parallel to but spaced from said disk portion whereby to accommodate the eye portions of the next-following link.

6. A self-linking chain element according to claim 1 including half-disks interposed between the eye portion and the half-pin portion of each half-link said disks extending in a plane normal to the plane of said eye portion and said pin, said half-pin portions extending in a plane parallel to but spaced from said disk portion whereby to accommodate the eye portions of the next-following link, said half-pin portions being provided sufficiently long that they will materially project beyond the confines of the eye portions of the next-following link, engaged by said pin portions.

7. A self-linking chain element according to claim 1 wherein one of said half-pin portions is wedge-shaped, and the other pin portion is grooved to engage said wedge-shaped portion.

8. A self-linking chain element according to claim 1, wherein the eye portions include keyways, and the half-pin portions terminate in keys adapted to enter said keyways when the link is being assembled.

9. A chain composed of the self-linking composite links according to claim 8, said chain being capable of being unlinked at any link.

10. A self-linking chain element according to claim 1, wherein the eye portions include keyways disposed on opposite sides of the openings in said portions, and stops on said portions in proximity to said keyways.

11. A self-linking chain element according to claim 1, wherein the half-pin portions terminate in beaks extending substantially at right angles to said pins.

12. A chain composed of the self-linking composite links according to claim 11.

13. A chain composed of the self-linking composite links according to claim 1.

14. As a torque transmitting driving element in a flexible shaft, a chain composed of the self-linking composite links according to claim 1.

References Cited by the Examiner
UNITED STATES PATENTS

| | | | |
|---|---|---|---|
| 541,997 | 7/1895 | Fravega et al. | 64—2.6 |
| 665,858 | 1/1901 | Aldrich | 64—2.6 |
| 1,238,847 | 9/1917 | Vanderveld | 59—78 |
| 1,353,134 | 9/1920 | Shiffer | 59—88 |
| 1,635,929 | 7/1927 | Dean | 64—2.6 |

CHARLES W. LANHAM, *Primary Examiner.*

FRANK SUSKO, WILLIAM J. STEPHENSON,
*Examiners.*